United States Patent
Chou et al.

(10) Patent No.: US 10,890,989 B1
(45) Date of Patent: Jan. 12, 2021

(54) TOUCH PAD DRIVING DEVICE AND TOUCH DRIVING METHOD

(71) Applicants: Yi-Chung Chou, Taipei (TW); Chih-Yuan Kuo, New Taipei (TW); Ta-Wei Liu, Hsinchu (TW)

(72) Inventors: Yi-Chung Chou, Taipei (TW); Chih-Yuan Kuo, New Taipei (TW); Ta-Wei Liu, Hsinchu (TW)

(73) Assignee: ITE Tech. Inc., Hsinchu (TW)

( * ) Notice: Subject to any disclaimer, the term of this patent is extended or adjusted under 35 U.S.C. 154(b) by 0 days.

(21) Appl. No.: 16/595,442

(22) Filed: Oct. 7, 2019

(30) Foreign Application Priority Data

Jul. 15, 2019 (TW) .............................. 108124883 A

(51) Int. Cl.
*G06F 3/0354* (2013.01)
*G06F 3/041* (2006.01)

(52) U.S. Cl.
CPC ........ *G06F 3/03547* (2013.01); *G06F 3/0416* (2013.01); *G06F 2203/04107* (2013.01)

(58) Field of Classification Search
CPC ......... G06F 3/0416; G06F 2203/04107; G06F 3/0446; G06F 3/0412; G06F 3/041–0412; G06F 3/044–0448; G06F 3/04166–041662; G02F 2001/13606
See application file for complete search history.

(56) References Cited

U.S. PATENT DOCUMENTS

| | | | |
|---|---|---|---|
| 2010/0065341 A1* | 3/2010 | Jeon .................. | G06F 3/044 178/18.06 |
| 2015/0091587 A1* | 4/2015 | Shepelev ............. | G06F 3/0412 324/658 |
| 2016/0334916 A1* | 11/2016 | Huang ................ | G09G 3/3655 |
| 2018/0120996 A1* | 5/2018 | Kang ................. | G06F 3/045 |
| 2018/0364830 A1* | 12/2018 | Shepelev ............. | G06F 3/044 |
| 2019/0079623 A1* | 3/2019 | Kim .................. | G06F 3/0412 |

FOREIGN PATENT DOCUMENTS

| CN | 104820532 | 8/2015 |
|---|---|---|
| TW | 201539287 | 10/2015 |
| TW | 201640296 | 11/2016 |

OTHER PUBLICATIONS

"Office Action of Taiwan Counterpart Application", dated Mar. 5, 2020, p. 1-p. 9.

* cited by examiner

*Primary Examiner* — Sanjiv D. Patel
(74) *Attorney, Agent, or Firm* — JCIPRNET

(57) ABSTRACT

A touch pad driving device and a touch driving method are provided. The touch pad driving device is configured to scan a plurality of sensing channels of a touch pad, cause the selected sensing channel in the plurality of sensing channels receive a touch driving signal, cause the sensing channels adjacent to or around the selected sensing channel receive a shielding signal, and cause the remaining sensing channels receive a reference signal, so as to reduce electromagnetic interference generated by the touch pad.

10 Claims, 7 Drawing Sheets

TOUCH PAD DRIVING DEVICE AND TOUCH DRIVING METHOD

CROSS-REFERENCE TO RELATED APPLICATION

This application claims the priority benefit of Taiwan application serial no. 108124883, filed on Jul. 15, 2019. The entirety of the above-mentioned patent application is hereby incorporated by reference herein and made a part of this specification.

BACKGROUND OF THE INVENTION

1. Field of the Invention

The present invention relates to a touch pad driving device and a touch driving method, and particularly relates to a touch pad driving device and a touch driving method capable of reducing the electromagnetic interference (EMI) of a touch pad.

2. Description of Related Art

In the existing self-capacitance touch pad, in order to increase the signal variation during touch, in the existing practice, parasitic capacitance between different sensing channels is reduced. Therefore, the same touch driving signal is provided to the plurality of sensing channels of the touch pad. However, larger electromagnetic interference (EMI) is often caused to the touch pad due to such a practice, thereby disturbing the operation of other circuits.

SUMMARY OF THE INVENTION

The present invention is directed to a touch pad driving device and a touch driving method, and particularly relates to a touch pad driving device and a touch driving method used for reducing the electromagnetic interference (EMI) of a touch pad.

The touch pad driving device of the present invention is configured to drive the touch pad. A plurality of sensing channels of the touch pad are arranged in a two-dimensional mode. The touch pad driving device includes a channel selection unit and a controller. The channel selection unit is coupled to the plurality of sensing channels. The controller is coupled to the channel selection unit. The controller is configured to control the channel selection unit to scan the plurality of sensing channels, cause one selected sensing channel in the plurality of sensing channels receive a touch driving signal through the channel selection unit, cause the sensing channels adjacent to the selected sensing channel receive a shielding signal through the channel selection unit according to position information, and cause the remaining sensing channels receive a reference signal through the channel selection unit according to the position information.

The touch driving method of the present invention is used for driving a touch pad. A plurality of sensing channels of the touch pad are arranged in a two-dimensional mode. The touch driving method includes: scanning the plurality of sensing channels; and causing one selected sensing channel in the plurality of sensing channels receive a touch driving signal, causing the sensing channels adjacent to the selected sensing channel together receive a shielding signal according to position information, and causing the remaining sensing channels together receive a reference signal according to the position information.

Based on the above, the plurality of sensing channels of the touch pad are scanned, the selected sensing channel receives the touch driving signal, and the sensing channels adjacent to the selected sensing channel together receive the shielding signal. The selected sensing channel and the sensing channels adjacent to the selected sensing channel receive the touch driving signal and the shielding signal. Thus, a small number of sensing channels of the touch pad receive the touch driving signal and the shielding signal. Therefore, the electromagnetic interference generated by the touch pad can be greatly reduced.

In order to make the aforementioned and other objectives and advantages of the present invention comprehensible, embodiments accompanied with figures are described in detail below.

DESCRIPTION OF THE EMBODIMENTS

Figure 1:
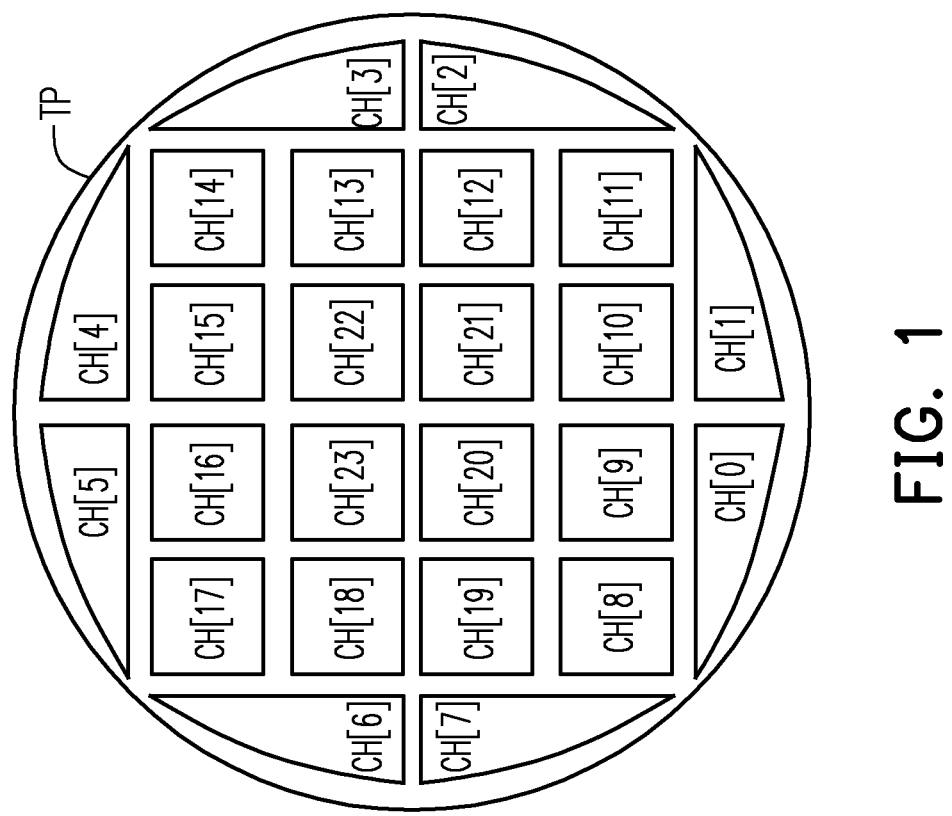
FIG. 1 is a schematic diagram of a layout of a touch pad according to a first embodiment of the present invention.
Figure 2:
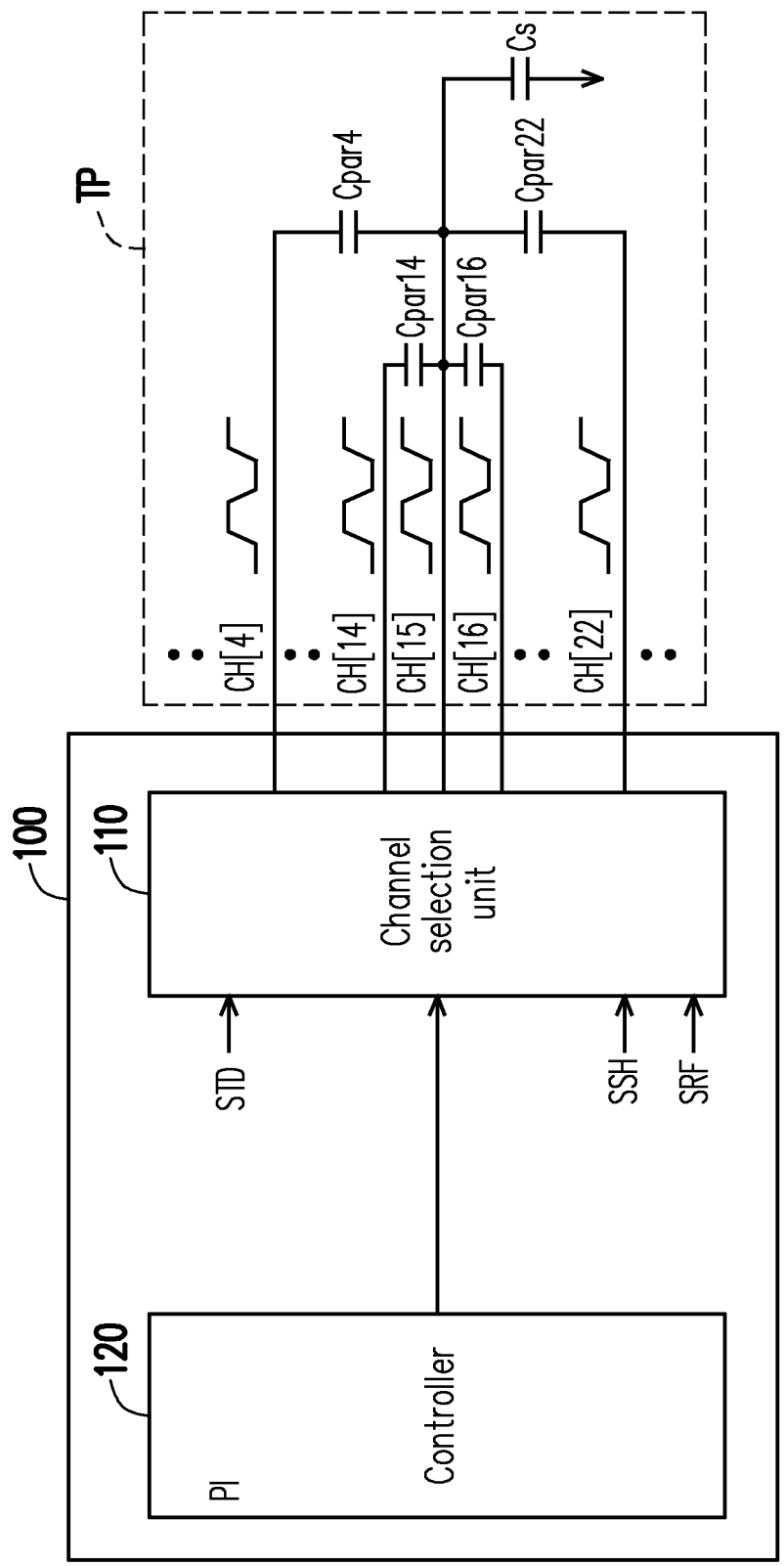
FIG. 2 is a schematic diagram showing that a touch pad driving device drives the touch pad according to the first embodiment of the present invention.

Simultaneously referring to FIG. 1 and FIG. 2, FIG. 1 is a schematic diagram of a layout of a touch pad according to a first embodiment of the present invention. FIG. 2 is a schematic diagram showing that a touch pad driving device drives the touch pad according to the first embodiment of the present invention. In the present embodiment, a touch pad TP is, for example, a touch pad with twenty four sensing channels CH[0]-CH[23]. The sensing channels CH[0]-CH[23] are arranged in a two-dimensional mode. The sensing channels CH[0]-CH[23] respectively correspond to one touch sensor. The touch pad TP of the present embodiment is exemplified by a circular touch pad. The present invention is suitable for driving self-capacitance touch pads in various shapes. The touch pad of the present invention can also be a polygonal touch pad or an annular touch pad. The shape of the touch pad and the number and the two-dimensional arrangement mode and order of the sensing channels in the present invention are not limited to the present embodiment.

In the present embodiment, a touch pad driving device 100 is configured to drive the touch pad TP. The touch pad driving device 100 is a control core of the touch pad TP. The touch pad driving device 100 includes a channel selection unit 110 and a controller 120. The channel selection unit 110 is coupled to the sensing channels CH[0]-CH[23]. The controller 120 is coupled to the channel selection unit 110. The controller 120 is configured to control the channel selection unit 110 to scan the sensing channels CH[0]-CH[23]. For example, in the process of scanning the sensing channels CH[0]-CH[23], when the sensing channel CH[15] is the selected sensing channel, the sensing channel CH[15]

receives a touch driving signal STD through the channel selection unit 110. Simultaneously, the sensing channels CH[4], CH[14], CH[16] and CH[22] adjacent to the selected sensing channel (namely, the sensing channel CH[15]) receive a shielding signal SSH through the channel selection unit 110 according to position information PI. Furthermore, the remaining sensing channels CH[1]-CH[3], CH[5]-CH[13], CH[15], CH[17]-CH[21] and CH[23] receive a reference signal SRF (such as grounding) through the channel selection unit 110 according to the position information PI. In the present embodiment, the touch driving signal STD is the same as the shielding signal SSH. Therefore, parasitic capacitance Cpar04 between the sensing channel CH[15] and the sensing channel CH[4] is eliminated. Parasitic capacitance Cpar14 between the sensing channel CH[15] and the sensing channel CH[14] is eliminated. Parasitic capacitance Cpar16 between the sensing channel CH[15] and the sensing channel CH[16] is eliminated. Similarly, parasitic capacitance Cpar22 between the sensing channel CH[15] and the sensing channel CH[22] is also eliminated. Therefore, the sensing channel CH[15] only retains sensing capacitance CS of the touch sensor. Thus, when the sensing channel CH[15] is touched, the signal variation can be increased to improve the signal-to-noise ratio (SNR) of the sensing channel CH[15]. In addition, at this point, in the touch pad TP, only the sensing channel CH[15] receives the touch driving signal STD, and only the sensing channels CH[4], CH[14], CH[16] and CH[22] receive the shielding signal SSH. Thus, the electromagnetic interference generated by the touch pad TP can be greatly reduced.

Then, when the sensing channel CH[16] is the selected sensing channel, the sensing channel CH[16] receives the touch driving signal STD through the channel selection unit 110. Simultaneously, the sensing channels CH[5], CH[15], CH[17] and CH[22] adjacent to the selected sensing channel (namely, the sensing channel CH[16]) receive the shielding signal SSH through the channel selection unit 110 according to the position information PI. The remaining sensing channels receive the reference signal SRF through the channel selection unit 110 according to the position information PI, and so on.

In the present embodiment, the position information PI is associated with a position relationship between the sensing channels CH[0]-CH[23]. In other words, the position information PI is associated with the layout of the sensing channels CH[0]-CH[23] of the touch pad TP. Therefore, the touch pad driving device 100 can identify a scanning order of the sensing channels CH[0]-CH[23] according to the position information PI corresponding to the touch pad TP, and can identify the sensing channels adjacent to the selected sensing channel according to the position information PI. It should be understood that the layout of the sensing channels of different touch pads TP has different position information PI.

In some embodiments, the touch pad driving device 100 can float the sensing channels which are not adjacent to the selected sensing channel.

In some embodiments, the sensing channels around the selected sensing channel receive the shielding signal SSH. Taking the sensing channel CH[15] as the selected sensing channel as an example, the sensing channels CH[4], CH[5], CH[13], CH[14], CH[16], CH[22] and CH[23] receive the shielding signal SSH, and the remaining sensing channels receive the reference signal SRF.

Figure 3:
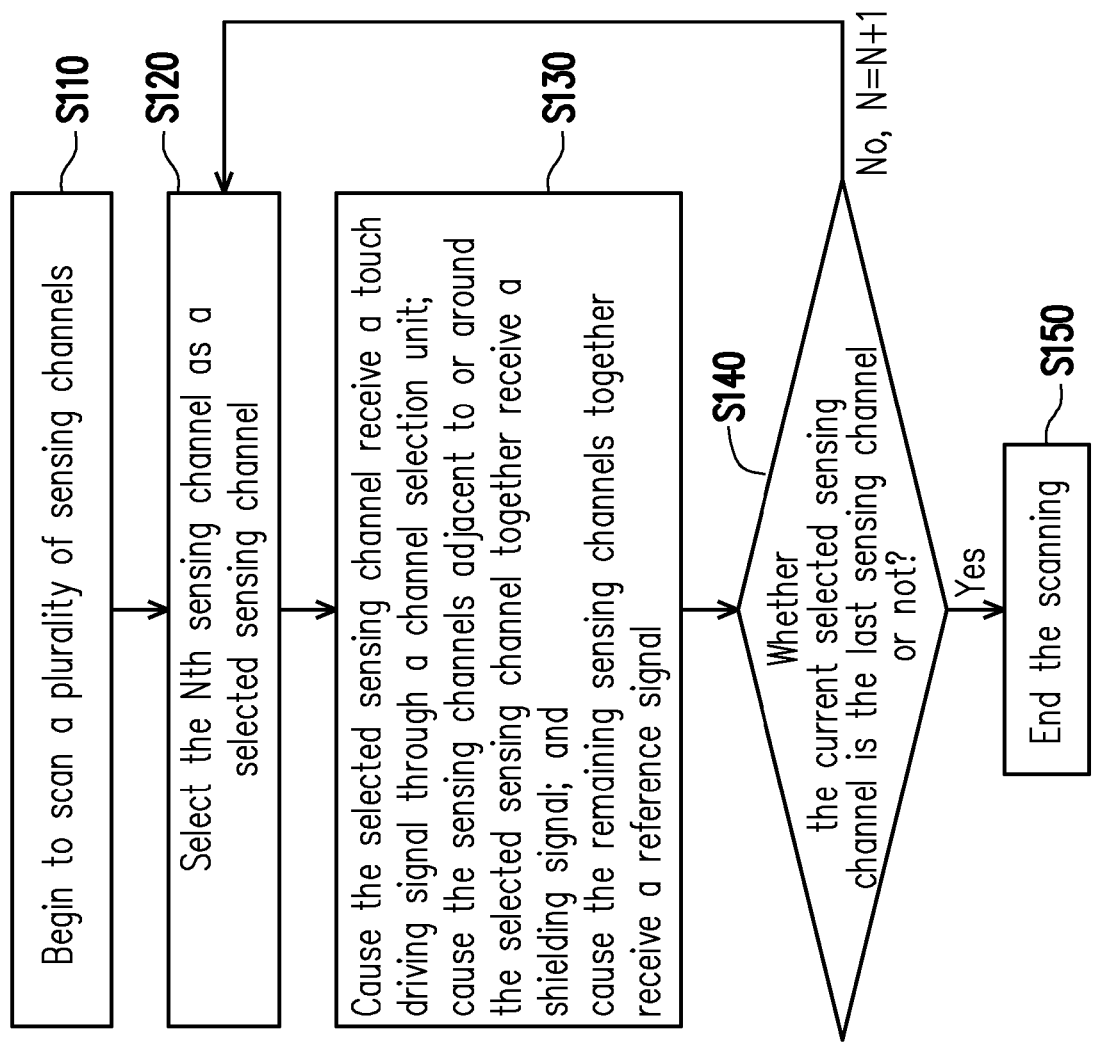
FIG. 3 is a flow diagram of a touch driving method according to the first embodiment of the present invention.

Referring to FIG. 2 and FIG. 3, FIG. 3 is a flow diagram of a touch driving method according to the first embodiment of the present invention. In the present embodiment, in step S110, the controller 120 of the touch pad driving device 100 controls the channel selection unit 110 to scan the sensing channels CH[0]-CH[23]. In the process of scanning the sensing channels CH[0]-CH[23], in step S120, the controller 120 selects one of the sensing channels CH[0]-CH[23] as the selected sensing channel. For example, in step S120, the controller 120 selects the sensing channel CH[15](namely, the Nth sensing channel in step S120) as the selected sensing channel. In step S130, the controller 120 causes the sensing channel CH[15] receive the touch driving signal STD, causes the sensing channels CH[4], CH[14], CH[16] and CH[22] adjacent to or around the sensing channel CH[15] receive the shielding signal SSH according to the position information PI, and causes the remaining sensing channels receive the reference signal SRF according to the position information PI. Further, the channel selection unit 110 is also coupled to the touch driving signal STD, the shielding signal SSH and the reference signal SRF. Therefore, the controller 120 causes the sensing channel CH[15] receive the touch driving signal STD through the channel selection unit 110. The controller 120 causes the sensing channels CH[4], CH[14], CH[16] and CH[22] receive the shielding signal SSH through the channel selection unit 110 according to the position information PI. The controller 120 causes the remaining sensing channels receive the reference signal SRF through the channel selection unit 110 according to the position information PI.

Then, based on the above, in step S140, the controller 120 judges whether the sensing channel CH[15] is the last sensing channel or not. If the controller 120 judges that the sensing channel CH[15] is the last sensing channel, step S150 is executed to end the scanning or return to step S110. On the other hand, if the controller 120 judges that the sensing channel CH[15] is not the last sensing channel, the controller 120 controls the channel selection unit 110 to select the next (namely, N=N+1) sensing channel and return to step S120 so as to take the next sensing channel as the selected sensing channel.

Figure 4:
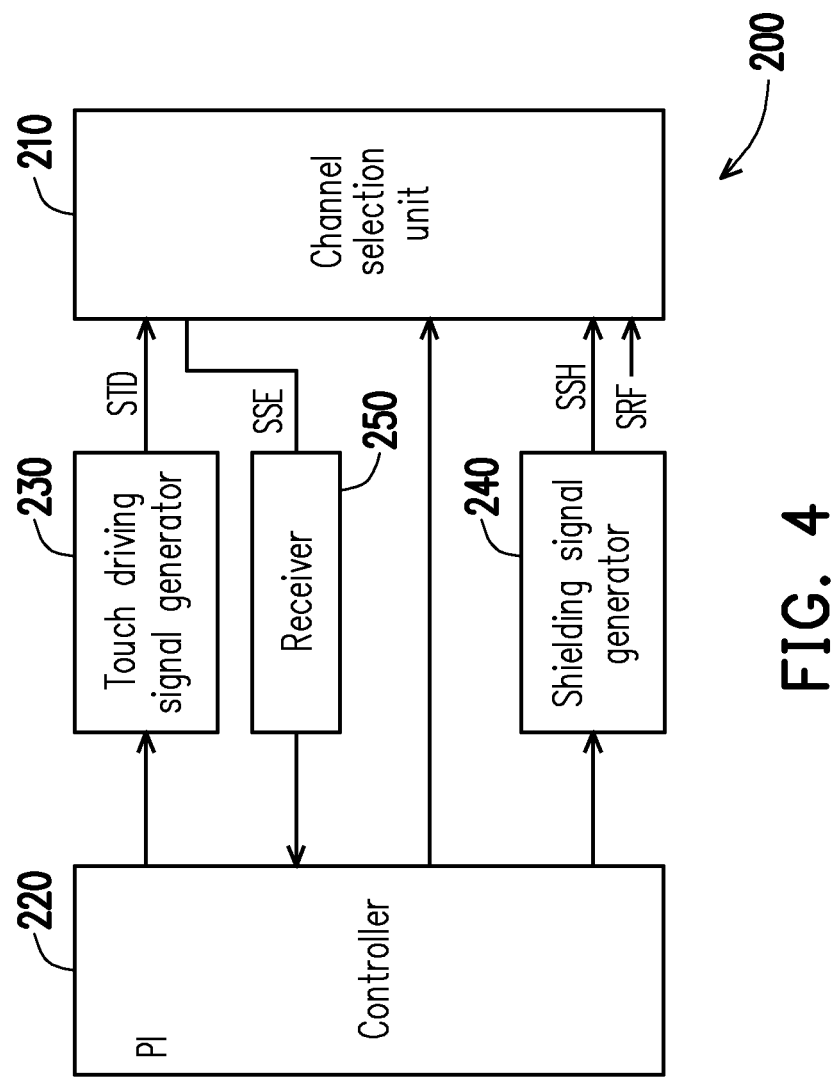
FIG. 4 is a schematic diagram of a touch pad driving device according to a second embodiment of the present invention.

Referring to FIG. 4, FIG. 4 is a schematic diagram of a touch pad driving device according to a second embodiment of the present invention. In the present embodiment, a touch pad driving device 200 includes a channel selection unit 210, a controller 220, a touch driving signal generator 230, and a shielding signal generator 240. The controller 220 controls the channel selection unit 210, and the implementation details of scanning the sensing channels can be sufficiently demonstrated in the first embodiment and therefore are not repeated herein. In the present embodiment, the touch driving signal generator 230 is coupled to the controller 220 and the channel selection unit 210. The touch driving signal generator 230 is configured to generate a touch driving signal STD in response to the control of the controller 220. In the present embodiment, the controller 220 can, for example, provide at least one of a first enable signal and a first clock to drive the touch driving signal generator 230. If the touch driving signal generator 230 is driven by receiving the first enable signal provided by the controller 220, the touch driving signal generator 230 internally generates the touch driving signal STD. If the touch driving signal generator 230 is driven by receiving the first clock provided by the controller 220, the touch driving signal generator 230 generates the touch driving signal STD according to the first clock. If the touch driving signal generator 230 is driven by receiving the first enable signal and the first clock provided by the controller 220, the touch driving signal generator 230 is enabled according to the first enable signal and generates the touch driving signal STD according to the first clock.

In the present embodiment, after the touch driving signal generator 230 generates the touch driving signal STD, the touch driving signal STD is provided to the channel selection unit 210.

In the present embodiment, the shielding signal generator 240 is configured to generate a shielding signal SSH in response to the control of the controller 220. In the present embodiment, the controller 220 can, for example, provide at least one of a second enable signal and a second clock to drive the shielding signal generator 240. If the shielding signal generator 240 is driven by receiving the second enable signal provided by the controller 220, the shielding signal generator 240 internally generates the shielding signal SSH. If the shielding signal generator 240 is driven by receiving the second clock provided by the controller 220, the shielding signal generator 240 generates the shielding signal SSH according to the second clock. If the shielding signal generator 240 is driven by receiving the second enable signal and the second clock provided by the controller 220, the shielding signal generator 240 is enabled according to the second enable signal and generates the shielding signal SSH according to the second clock.

In the present embodiment, after the shielding signal generator 240 generates the shielding signal SSH, the shielding signal SSH is provided to the channel selection unit 210.

In the present embodiment, the touch pad driving device 200 can also include a reference signal generator (not shown) configured to generate a reference signal SRF. The reference signal generator is coupled to the channel selection unit 210. After the reference signal generator generates the reference signal SRF, the reference signal SRF is provided to the channel selection unit 210, however, the present invention is not limited thereto. In some embodiments, the reference signal generator is coupled to the controller 220 and the channel selection unit 210. After the reference signal generator generates the reference signal SRF in response to the control of the controller 220, the reference signal SRF is provided to the channel selection unit 210. In the embodiments, the controller 220 can, for example, provide at least one of a third enable signal and a third clock to drive the reference signal generator. The implementation details of driving the reference signal generator can be sufficiently demonstrated by multiple implementation details of the controller 220, the touch driving signal generator 230 and/or the shielding signal generator 240 and therefore are not repeated herein. In some embodiments, the channel selection unit 210 can receive the reference signal SRF from the outside. In some embodiments, the reference signal SRF can be provided by the controller 220.

In the present embodiment, the touch pad driving device 200 also includes a receiver 250. The receiver 250 is coupled to the controller 220 and the channel selection unit 210. The receiver 250 is configured to receive a sensing signal SSE from the selected sensing channel and provide the sensing signal SSE to the controller 220. In the present embodiment, the receiver 250 can receive the sensing signal SSE in a time interval in which a sensor corresponding to the selected sensing channel receives the touch driving signal STD. The sensing signal SSE is a result that a sensed capacitance value of the sensor changes due to touch. In some embodiments, the receiver 250 can receive the sensing signal SSE in a next time interval of the time interval in which the sensor receives the touch driving signal STD.

Figure 5:
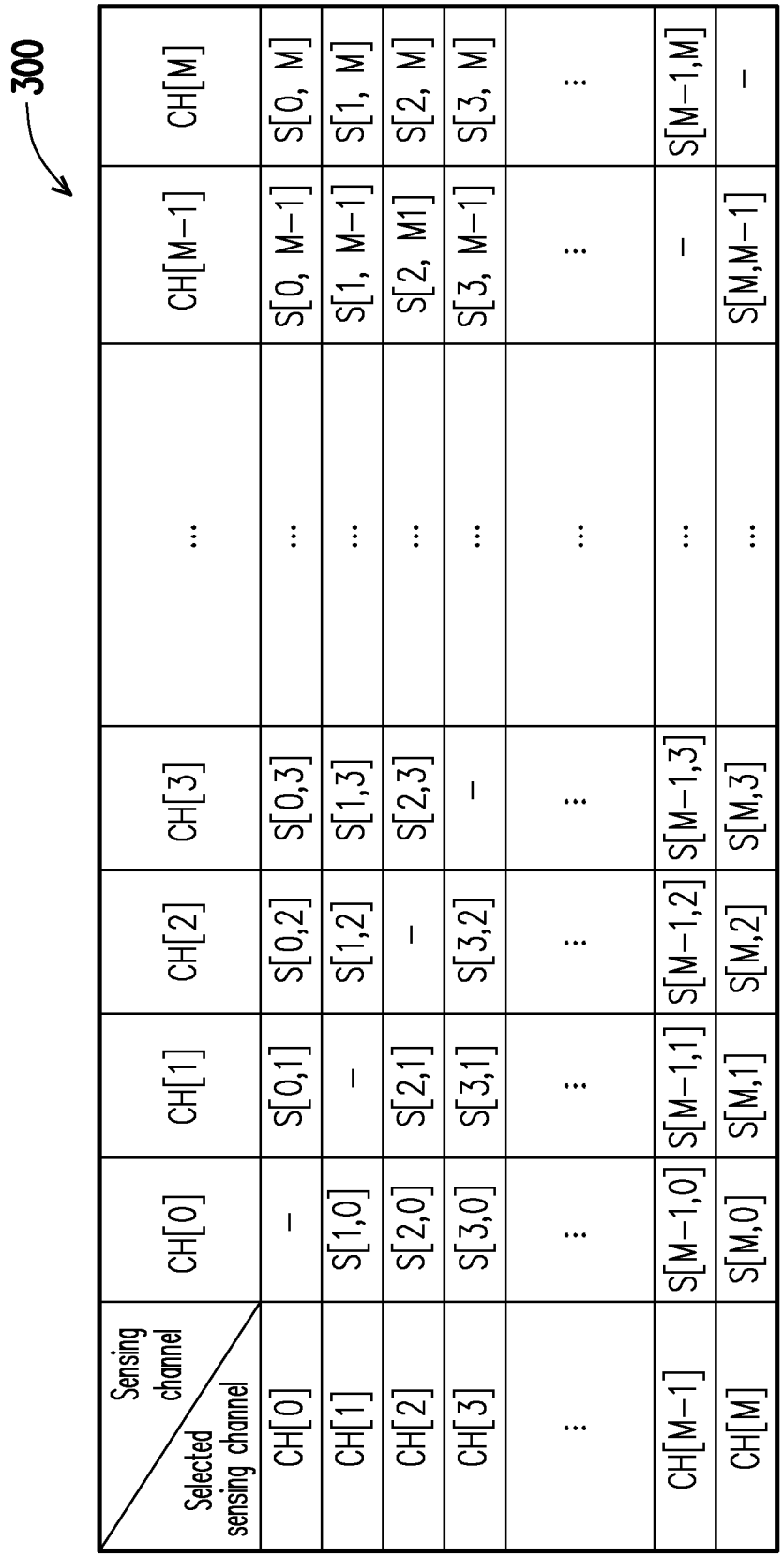
FIG. 5 is a schematic diagram of a template of a shielding table according to an embodiment of the present invention.

Simultaneously referring to FIG. 2 and FIG. 5, FIG. 5 is a schematic diagram of a template of a shielding table according to an embodiment of the present invention. In the present embodiment, a template 300 of the shielding table has M rows of the selected sensing channel and M columns of the sensing channels. A plurality of contents S[0, 1]–S[M, M–1] of the template 300 of the shielding table can be recorded respectively according to a layout of the plurality of sensing channels of the touch pad TP. In the present embodiment, the contents S[0, 1]–S[M, M–1] can be flags or identification codes for representing the shielding signal SSH or the reference signal SRF. For example, the sensing channels CH[1] and CH[3] are adjacent to the sensing channel CH[2], and the remaining sensing channels CH[0] and CH[4]–CH[M] are not adjacent to the sensing channel CH[2]. In the case of such a layout, the contents S[2, 1] and S[2, 3] are flags (or identification codes) for representing the shielding signal SSH. The sensing channels CH[0] and CH[4]–CH[M] are flags (or identification codes) for representing the reference signal SRF. It can be seen that the template 300 of the shielding table has corresponding contents because of the layout of the sensing channels of the touch pad TP. Therefore, the touch pad driving device 100 can identify the sensing channels adjacent to (or around) the selected sensing channel and the sensing channels not adjacent to (or not around) the selected sensing channel according to the template 300 of the shielding table. The controller 120 can obtain the position information PI according to different shielding tables. Thus, the touch pad driving device 100 is suitable for various types of touch pads or touch pads with various layouts of sensing channels.

In the present embodiment, the shielding table can be stored in a storage device arranged outside the controller 120. In some embodiments, the shielding table can be stored in a storage device arranged inside the controller 120.

Figure 6:
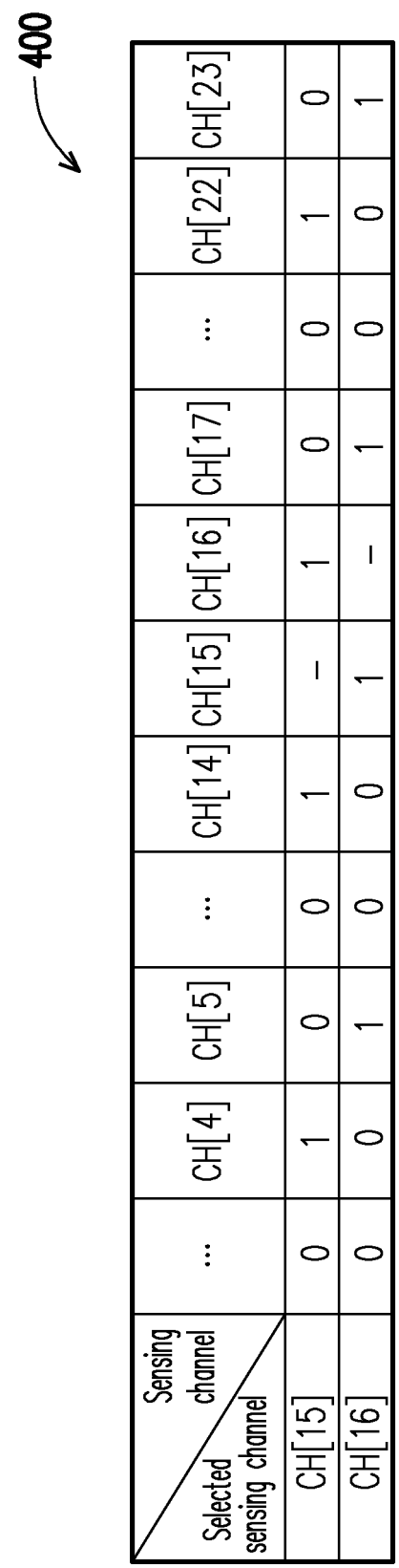
FIG. 6 is a schematic diagram of a portion of the shielding table according to FIG. 1 of the present invention.
Figure 7:
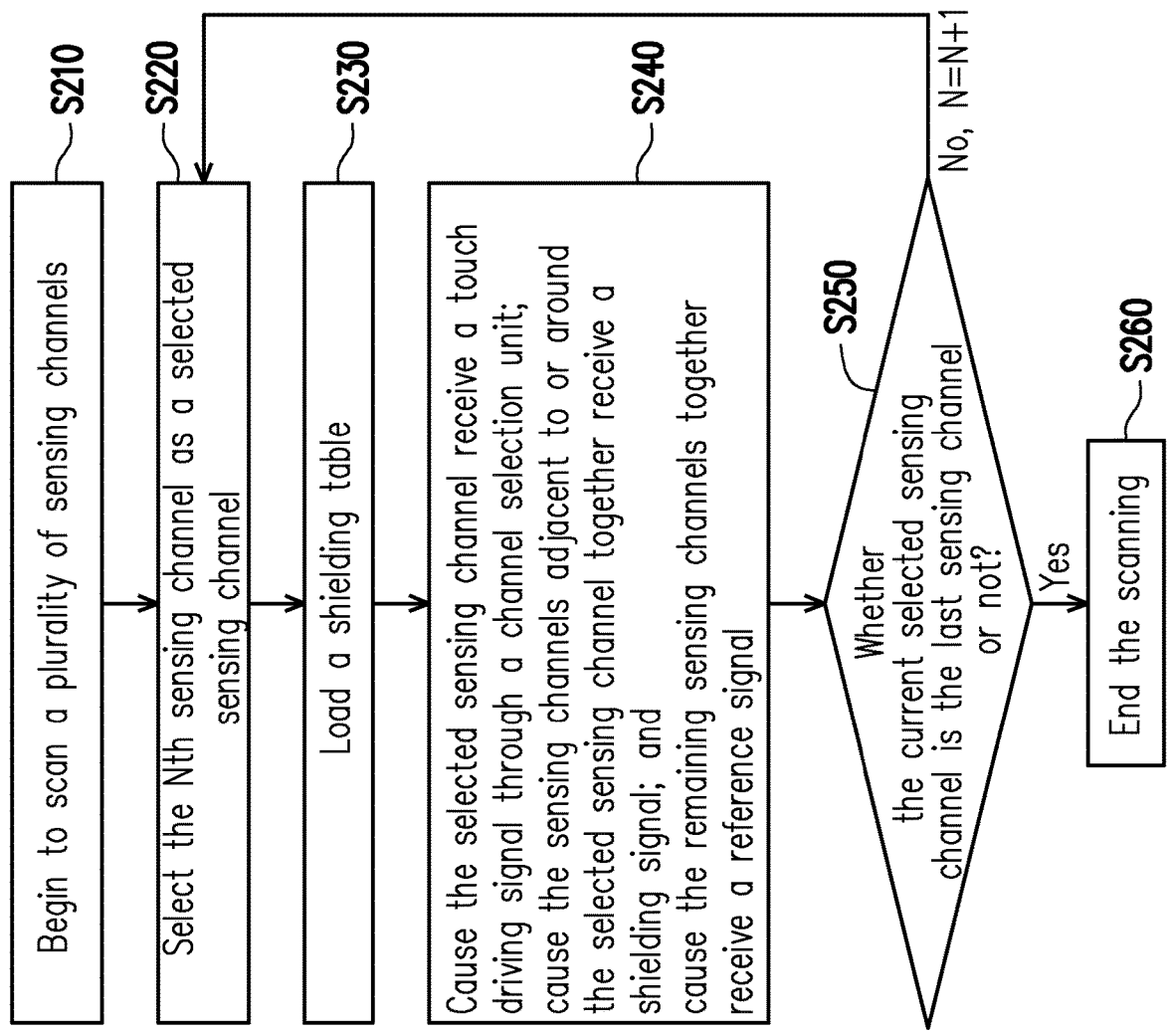
FIG. 7 is a flow diagram of a touch driving method according to a third embodiment of the present invention.

For example, simultaneously referring to FIG. 1 and FIG. 6, FIG. 6 is a schematic diagram of a portion of the shielding table according to FIG. 1 of the present invention. In FIG. 7, a portion 400 of the shielding table is a shielding table for the selected touch channel of the touch pad TP as the touch channel CH[15] or the touch channel CH[16]. In the rows of the selected sensing channel CH[15], flags of the sensing channels CH[4], CH[14], CH[16] and CH[22] adjacent to the sensing channel CH[15] represent [1] of the shielding signal SSH, and flags of the remaining sensing channels represent [0] of the reference signal SRF. In the rows of the selected sensing channel CH[16], the flags of the sensing channels CH[5], CH[15], CH[17] and CH[22] adjacent to the sensing channel CH[16] represent [1] of the shielding signal SSH, and flags of the remaining sensing channels represent [0] of the reference signal SRF.

Simultaneously referring to FIG. 2, FIG. 6 and FIG. 7, FIG. 7 is a flow diagram of a touch driving method according to a third embodiment of the present invention. In the present embodiment, in step S210, the controller 120 of the touch pad driving device 100 controls the channel selection unit 110 to begin scanning the sensing channels CH[0]-CH[23]. In the process of scanning the sensing channels CH[0]-CH[23], in step S220, the controller 120 selects one of the sensing channels CH[0]-CH[23] as the selected sensing channel. Once the selected sensing channel is determined, in step S230, the controller 120 loads the shielding table so as to obtain the position information PI. For example, in step S220, the controller 120 selects the sensing channel CH[15] (namely, the Nth sensing channel in step S220) as the selected sensing channel. In step S230, the controller 120 loads the contents of the row of the selected sensing channel CH[15] of the shielding table so as to obtain the position information PI when the selected sensing channel is the sensing channel CH[15].

Based on the above, in step S240, the controller 120 causes the sensing channel CH[15] receive the touch driving signal STD, causes the sensing channels CH[4], CH[14], CH[16] and CH[22] adjacent to or around the sensing channel CH[15] receive the shielding signal SSH according to the position information PI, and causes the remaining sensing channels receive the reference signal SRF according to the position information PI.

Based on the above, in step S250, the controller 120 judges whether the sensing channel CH[15] is the last sensing channel or not. If the controller 120 judges that the sensing channel CH[15] is the last sensing channel, step S260 is executed to end the scanning. On the other hand, if the controller 120 judges that the sensing channel CH[15] is not the last sensing channel, the controller 120 controls the channel selection unit 110 to select the next (namely, N=N+1) sensing channel and return to step S220 so as to take the next sensing channel as the selected sensing channel. If the controller 120 judges that the sensing channel CH[15] is not the last sensing channel, step S220 is executed again and the sensing channel CH[16] is taken as the selected sensing channel. In step S230, the controller 120 loads the contents of the row of the selected sensing channel CH[16] of the shielding table so as to obtain the position information PI when the selected sensing channel is the sensing channel CH[16]. Subsequently, step S240 is executed, and so on.

In conclusion, the plurality of sensing channels of the touch pad are scanned, the selected sensing channel receives the touch driving signal, and the sensing channels adjacent to the selected sensing channel together receive the shielding signal according to the position information. The selected sensing channel and the sensing channels adjacent to the selected sensing channel receive the touch driving signal and the shielding signal. Thus, a small number of sensing channels of the touch pad receive the touch driving signal and the shielding signal. Therefore, the electromagnetic interference generated by the touch pad can be greatly reduced. In addition, the present invention obtains the position information by the shielding table, and therefore, the present invention is suitable for various types of touch pads or touch pads with various layouts of sensing channels.

Although the present invention is described with the above embodiments, it is not intended to limit the present invention. Any person of ordinary skill in the art can make some changes and modifications without departing from the spirit and the scope of the present invention. Therefore, the protection scope of the present invention shall be defined by the appended claims.

What is claimed is:

1. A touch pad driving device, configured to drive a touch pad for a self-capacitance touch sensing, wherein a plurality of sensing channels of the touch pad are arranged in a two-dimensional mode, and the touch pad driving device comprises:
   a channel selection unit, coupled to the sensing channels; and
   a controller, coupled to the channel selection unit and configured to control the channel selection unit to scan the sensing channels, cause one selected sensing channel in the sensing channels receive a touch driving signal through the channel selection unit, cause all of sensing channels adjacent to or around the selected sensing channel in the sensing channels receive a shielding signal through the channel selection unit according to position information, and cause all of remaining sensing channels in the sensing channels receive a reference signal through the channel selection unit according to the position information, wherein the reference signal is different from the touch driving signal and the shielding signal,
   wherein the controller obtains the position information through a shielding table corresponding to a layout of the sensing channels, wherein the shielding table comprises a first flag for representing the shielding signal and a second flag for representing the reference signal, wherein the controller obtains the position information according to the first flag and the second flag.

2. The touch pad driving device according to claim 1, wherein the touch sensing signal is the same as the shielding signal.

3. The touch pad driving device according to claim 2, wherein when one of the sensing channels is selected as the selected sensing channel, the controller loads the shielding table.

4. The touch pad driving device according to claim 1, wherein the touch pad driving device also comprises:
   a touch driving signal generator, coupled to the controller and the channel selection unit and is configured to generate the touch driving signal in response to the control of the controller and provide the touch driving signal to the channel selection unit.

5. The touch pad driving device according to claim 1, wherein the touch pad driving device also comprises:
   a receiver, coupled to the controller and the channel selection unit and is configured to receive a sensing signal from the selected sensing channel and provide the sensing signal to the controller.

6. The touch pad driving device according to claim 1, wherein the touch pad driving device also comprises:
   a shielding signal generator, coupled to the controller and the channel selection unit and is configured to generate the shielding signal in response to the control of the controller and provide the shielding signal to the channel selection unit.

7. The touch pad driving device according to claim 1, wherein the touch pad driving device also comprises:
   a reference signal generator, coupled to the channel selection unit and is configured to generate the reference signal and provide the reference signal to the channel selection unit.

8. A touch driving method, used for driving a touch pad for a self-capacitance touch sensing, wherein a plurality of sensing channels of the touch pad are arranged in a two-dimensional mode, and the touch driving method comprises:
   scanning the sensing channels; and
   causing one selected sensing channel in the sensing channels receive a touch driving signal, causing all of the sensing channels adjacent to or around the selected sensing channel in the sensing channels together receive a shielding signal according to position information, and causing all of the remaining sensing channels in the sensing channels together receive a reference signal according to the position information, wherein the reference signal is different from the touch driving signal and the shielding signal,
   the position information is obtained through a shielding table corresponding to a layout of the sensing channels, wherein the shielding table comprises a first flag for representing the shielding signal and a second flag for representing the reference signal, wherein the position information is obtained according to the first flag and the second flag.

9. The touch driving method according to claim 8, wherein the touch sensing signal is the same as the shielding signal.

10. The touch driving method according to claim 8, also comprising:
    when one of the sensing channels is selected as the selected sensing channel, loading the shielding table.

\* \* \* \* \*